May 6, 1958  M. OLLEY  2,833,366
INDEPENDENT REAR WHEEL SUSPENSION
Filed April 13, 1955
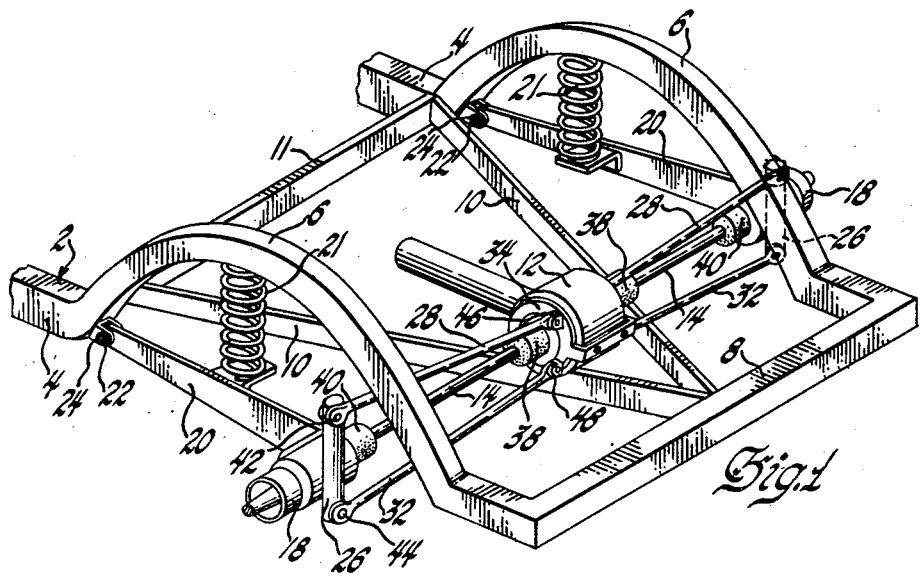
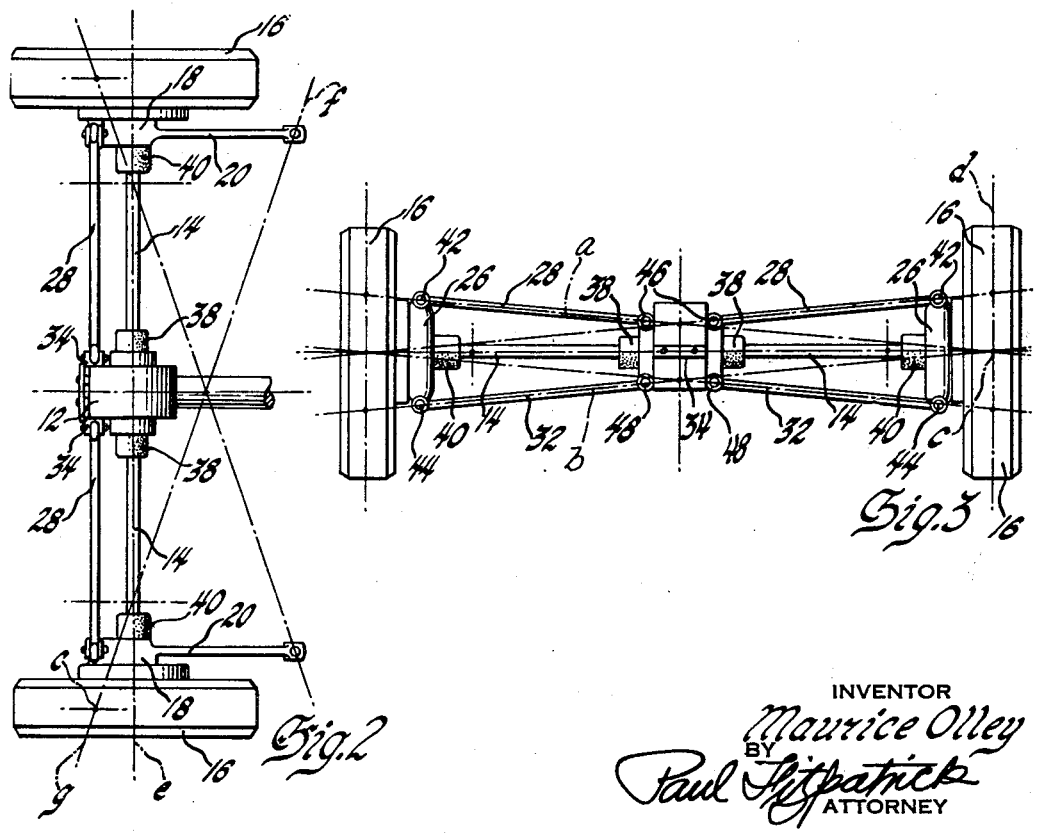
INVENTOR
Maurice Olley
BY
Paul Fitzpatrick
ATTORNEY United States Patent Office 2,833,366
Patented May 6, 1958

2,833,366

INDEPENDENT REAR WHEEL SUSPENSION

Maurice Olley, Detroit, Mich., assignor to General Motors Corporation, Detroit, Mich., a corporation of Delaware Application April 13, 1955, Serial No. 501,103

7 Claims. (Cl. 180—73)

This invention relates to vehicle suspension and more particularly to independent semi-swing rear wheel suspension.

It has been proposed in the past to independently suspend vehicle rear wheels on rearwardly extending lever arms having a horizontal axis of rotation extending transversely diagonally of the vehicle to intersect the axis of rotation of the wheels at a point intermediate between the differential and the opposite wheel of the vehicle. This arrangement is commonly referred to as semi-swing independent rear wheel suspension. While previously known forms of semi-swing suspensions have produced generally satisfactory wheel geometry, a relatively high increase in wheel toe-in occurs in both the compression and rebound positions. In addition, the lever arm is required to resist not only driving and braking forces, but also must be capable of absorbing side thrust and severe twisting moment resulting from cornering of the vehicle.

An object of the present invention is to provide an improved semi-swing independent rear suspension which is capable of maintaining approximately constant wheel toe-in throughout the range of movement from compression to rebound.

Another object is to provide a semi-swing independent rear wheel suspension wherein each wheel has a wide base of support on an inclined axis of motion producing moderate camber change and lift of roll center without causing appreciable change of toe-in.

In accordance with the general features of the invention, there is provided a suspension of the stated character wherein each wheel is independently suspended on a pivotally mounted longitudinally extending lever arm, the path of movement of which is controlled, in part, by a pair of generally transversely extending swingable radius rods, the opposite ends of which are pivotally mounted, respectively, at spaced points on the free end of the lever arm and spaced points fixed with respect to the vehicle, the pivotal connection being so arranged so as to cause the projected axes of the radius rods to converge at a point adjacent the intersection of the vertical plane of the opposite wheel and the axis of rotation thereof, thereby providing an effective axis of motion for each wheel which extends between the pivotal mounting of the associated lever arm and the point adjacent the intersection of the vertical plane and axis of rotation of the opposite wheel.

Yet a further object is to provide a suspension of the type described wherein the axis of motion of the wheel may be varied by increasing or decreasing the angle of convergence of the radius rods.

Still a further object is to provide a suspension of the type described wherein the degree of wheel toe-in may be varied by increasing or decreasing the length of the radius rods.

A still further object is to provide a suspension of the type described which is simple in construction, low in cost and efficient in operation.

These and other objects, advantages and features of the invention will become more fully apparent as reference is had to the accompanying specification and drawings wherein:

Fig. 1 is a fragmentary perspective view of the rear portion of a vehicle chassis, illustrating the form and arrangement of the invention.

Fig. 2 is a diagrammatic plan view illustrating the arrangement of the suspension linkage and associated structure; and Fig. 3 is a diagrammatic rear elevational view illustrating the arrangement of the converging swingable radius rods between the respective wheels and vehicle differential housing.

Referring now to the drawings and particularly Fig. 1, there is illustrated the rear portion of a vehicle frame 2. Frame 2 is provided with generally parallel side members 4 which are formed with the usual upwardly extending curved portions 6. Curved portions 6 provide clearance for vertical movement of the vehicle wheels from the normal position. A rear frame cross member 8 extends between and is rigidly connected to the rear extremities of side members 4. A pair of angle struts or frame braces 10 are connected at their forward ends to a second frame cross member 11 adjacent the forward extremities of curved portions 6 and converge rearwardly for connection with the transverse midportion of cross member 8. Struts 10 are adapted to support a vehicle differential housing 12. Housing 12 is preferably disposed between and supported by the struts at a position in lateral alignment with the effective centers of curved portions 6. As seen in Figs. 1, 2, and 3, differential 12 drivingly engages a pair of laterally oppositely directed swing axles 14 which are effective to cause rotation of the vehicle wheels 16. Each wheel 16 is rotatably mounted on a wheel supporting hub 18 which is formed integrally on and extends transversely outwardly from the rearward end of a longitudinally extending lever arm 20. The forward end of each lever arm 20 is, in turn, pivotally secured to the forward extremity of one of struts 10 by means of a transversely directed pivotal connection 22. Connections 22 are preferably provided with resilient bushings 24, such as rubber, to provide a flexible joint permitting slight variations in the planes of movement of lever arms 20 and preventing transmission of road noises to frame 2. A coil spring 21 is disposed in compression between each arm 20 and the curved portion 6 of frame 2 to resiliently support the latter relative to the wheels 16.

In order to control the axis of motion of each wheel 16 in accordance with one feature of the present invention, each lever arm 20 is provided at its rearward end with a relatively short vertically extending member 26 which is rigidly secured to the wheel supporting hub portion 18. At their opposite ends, each member 26 pivotally engages the outer end of an upper transversely extending radius or control rod 28 and the outer end of a lower transversely extending radius or control rod 32, respectively. At their inner ends, rods 28 and 32 are pivotally connected, in spaced relation, to a bracket 34 which in the embodiment shown is secured on differential housing 12. It will be understood, however, that bracket 34 may, if desired, be connected directly to frame 2. In order to assure quiet operation and permit absorption of stresses resulting from dissimilar paths of movement of longitudinal lever arms 20 and control rods 28 and 32, it is preferable that the various pivotal connections for rods 28 and 32 be provided with resilient bushings, such as previously referred to in connection with the pivotal connection 22 for lever arm 20. When arranged in the manner described, each of the longitudinal lever arms 20 resists braking and driving thrust, while side thrust, twisting moment, and other side forces resulting from cornering are resisted by control rods 28 and 32.

In order to permit each wheel 16 to travel in the path defined by the associated lever arm 20 and control rods 28 and 32, each swing axle 14 is provided at its opposite ends with universal joints 38 and 40. Universal joints 38 are mounted in any convenient manner at each side of differential housing 12 while each joint 40 is carried by the respective wheel supporting hub 18. To accommodate changes in linear distance between differential 12 and wheel supporting hub 18 resulting from vertical deflection of lever arm 20, either end of each axle 14 may, for example, be splined to the adjacent universal joint, thereby permitting relative axial movement therebetween while maintaining driving engagement therewith.

In accordance with another feature of the invention, upper and lower control rods 28 and 32 are disposed in vertically converging relation so that their respective centerlines produced will intersect at a point adjacent the intersection of the vertical midplane and axis of rotation of the opposite vehicle wheel. As seen in Fig. 3, the pivotal connections 42 and 44 at the outer end of rods 28 and 32 are spaced apart vertically a greater distance than the pivotal connections 46 and 48 at the inner ends of the rods. Consequently, the centerlines "a" and "b" of rods 28 and 32 ultimately intersect at the point "c," which in the embodiment shown falls in the vertical midplane "d" of the opposite vehicle wheel 16 and slightly rearwardly of the axis of rotation "e" thereof. Since the centerlines "a" and "b" of rods 28 and 32 intersect at "c," the virtual radius arm center for member 26 is point "c." That is, swinging movement of the rods, as seen in rear elevation, tends to cause the associated vertically extending member 26 to move bodily through a vertical arc similar to that provided by an imaginary radius arm pivoted at point "c." Because of the long effective radius of the arc generated, lateral inward tipping of the upper end of member 26 is very slight; therefore, only a moderate change in wheel camber occurs.

As another incidence of swinging movement of rods 28 and 32, vertically extending member 26 is moved bodily inwardly toward the longitudinal midline of the vehicle. Therefore, wheel 16 is pulled laterally inwardly as it rises and falls above and below the normal central position. Since vertically extending member 26 is integral with longitudinally extending lever arm 20, the inward pulling action of rods 28 and 32 causes the longitudinal lever arm 20 to swing laterally inwardly, as seen in the plan view, about a generally vertical axis passing through the center of pivotal connection 22. Since the wheel supporting hub 18 is also integral with arm 20, wheel 16 is caused to toe-out progressively as it rises and falls above and below its normal center position. However, because of the forward pivotal connections of each lever arm 20, wheels 16 swing about an effective axis of motion $f-g$ which extends between the pivotal connection 22 of arm 20 and the point "c" lying adjacent the intersection of the vertical midplane "d" and the axis of rotation "e" of the opposite wheel 16. The inclined axis $f-g$ tends to cause wheel 16 to toe-in as it rises and falls. Consequently, by varying the length of rods 28 and 32, a toe-out tendency may be imparted to wheel 16 which exactly balances, or reduces to the degree desired, the toe-in tendency caused by the inclined axis $f-g$. As a result, there is provided a semi-swing independent rear suspension having an inclined axis of motion producing moderate camber change and lift of roll center with little or no change of wheel toe-in.

In connection with the foregoing, it should also be noted that by merely changing the angle of convergence of rods 28 and 32, substantial changes in the entire suspension geometry may be effected. By way of example, if the rods 28 and 32 are disposed in parallel relation, the resulting suspension is substantially equivalent to that produced by a simple longitudinal lever, while if rods 28 and 32 converge at their inner ends 46 and 48, the resulting wheel suspension geometry is equivalent to that provided by a conical motion swing axle suspension.

From the foregoing, it will be seen that a novel and efficient independent rear wheel suspension has been devised. The invention is not only simple in construction, low in cost, and relatively light in weight, but in addition, is capable of providing a wide variation in suspension geometry by relatively slight changes therein.

While but one embodiment has been shown and described, it will be apparent that changes and modifications may be made therein. It is, therefore, to be understood that it is not intended to limit the invention to the embodiments shown, but only by the scope of the claims which follow.

I claim:

1. In an independent suspension for a vehicle having a frame, a longitudinally extending lever pivotally connected to said frame, a road wheel rotatably mounted on said lever, means disposed between said lever and said frame to resiliently support the latter, and a pair of vertically converging transversely extending control rods pivotally connected at their outer ends to said lever arm and at their inner ends to said frame, the prolonged axes of said arms intersecting at a point between the longitudinal midline of the vehicle and the opposite side thereof.

2. In an independent suspension for a vehicle having a frame, a longitudinally extending lever pivotally connected at its forward end to said frame, a road wheel rotatably mounted on said lever at its rearward end, means disposed between said lever and said frame to resiliently support the latter, and a pair of vertically converging transversely extending control rods pivotally connected at their outer ends to said lever arm and at their inner ends to said frame between said wheel and the longitudinal midline of said vehicle, the prolonged axes of said arms intersecting at a point between the longitudinal midline of the vehicle and the opposite side thereof.

3. In an independent suspension for a vehicle having a frame, a longitudinally extending lever arm, a flexible pivot connecting one end of said arm to said frame, a road wheel rotatably mounted on the opposite end of said lever arm, spring means disposed between said lever arm and said frame to resiliently support the latter, and a pair of vertically spaced transversely inwardly converging control rods pivotally connected at their outer end to said lever arm and at their inner end to said frame, said inner connections being disposed between said wheel and the longitudinal midline of the vehicle, the convergence of said control rods being such that the prolonged axes thereof intersect at a point between the longitudinal midline of the vehicle and the side opposite said wheel, whereby to provide an effective axis of motion for said wheel extending between the flexible pivot connection for said lever arm and the point of intersection of the prolonged axes of said control rod.

4. In an independent suspension for a vehicle having a frame mounted differential including oppositely extending swinging half axles, a longitudinally extending lever at each side of said vehicle, means pivotally connecting the forward end of each of said levers to said frame, a wheel rotatably mounted at the rearward end of each of said levers, means operatively connecting each of said wheels to the adjacent half axle, and means interconnecting the rearward ends of each of said lever arms and said frame, whereby each of said wheels is caused to move in a path defined by an axis extending diagonally between the forward pivotal connection of the associated lever arm and a point located adjacent the opposite wheel, said means comprising vertically spaced transverse control rods arranged in inwardly converging relation.

5. In a motor vehicle having a frame, a road wheel at each side of said frame carried on a longitudinally extending lever arm having its forward end pivotally attached to said frame, a differential mounted on said frame midway between said road wheels, swing half axles operatively connecting said differential and each of said road wheels, and a pair of transversely extending control rods for each of said wheels, each pair of control rods having their outer ends pivotally connected at vertically spaced apart points on one end of the adjacent lever arm, the inner ends of said rods being pivotally connected to frame supported parts at vertically spaced apart points between the longitudinal midline of said differential and the wheel adjacent the outer pivotal connections of said rods, the spacing between the inner pivotal connections being less than the spacing between the outer pivotal connections whereby the prolonged axes of said rods converge at a point on the opposite side of said differential.

6. In a rear wheel suspension for vehicles including a frame, a longitudinal lever pivotally connected to said frame, a pair of vertically spaced inwardly converging transverse rods pivotally connected at their opposite ends, respectively to said lever and said frame, and a wheel supported on said lever for swingable movement about an inclined axis of motion tending to cause wheel toe-in, the improvement which consists in proportioning the length of the transverse rods to cause a laterally inward pulling action on the wheel and lever arm during swinging thereof effective to substantially offset the said wheel toe-in.

7. In a motor vehicle having a frame, a road wheel at each side of said frame carried on a longitudinally extending lever arm pivotally attached to said frame, a differential mounted on said frame between said road wheels, swinging half axles operatively connecting said differential and each of said road wheels, and a pair of transversely extending control rods for each of said wheels, each pair of control rods having their outer ends pivotally connected to one end of the adjacent lever arm and their inner ends pivotally connected to frame supported parts between said differential and the wheel adjacent the outer pivotal connections of said rods, the vertical spacing between the said inner and outer pivotal connections being such that the prolonged axes of said rods converge at a point on the opposite side of said differential thereby providing an inclined axis of motion for said wheel which extends between the forward pivotal connection of said lever arm and the point of convergence of said prolonged axes, the length of said rods being proportioned to impart a degree of wheel toe-out substantially equal to the degree of wheel toe-in resulting from movement of said wheel about said inclined axis.

References Cited in the file of this patent

UNITED STATES PATENTS

| | | |
|---|---|---|
| 2,041,992 | Charles | May 26, 1936 |
| 2,245,809 | Olley | June 17, 1941 |
| 2,286,609 | Ledwinka | June 16, 1942 |
| 2,330,633 | Seyerle | Sept. 28, 1943 |
| 2,367,817 | Brown | Jan. 23, 1945 |